C. BAEDER.
MODE OF POLISHING RAWHIDE WHIPS.
A. I. No. 114. Patented Oct. 17, 1854.
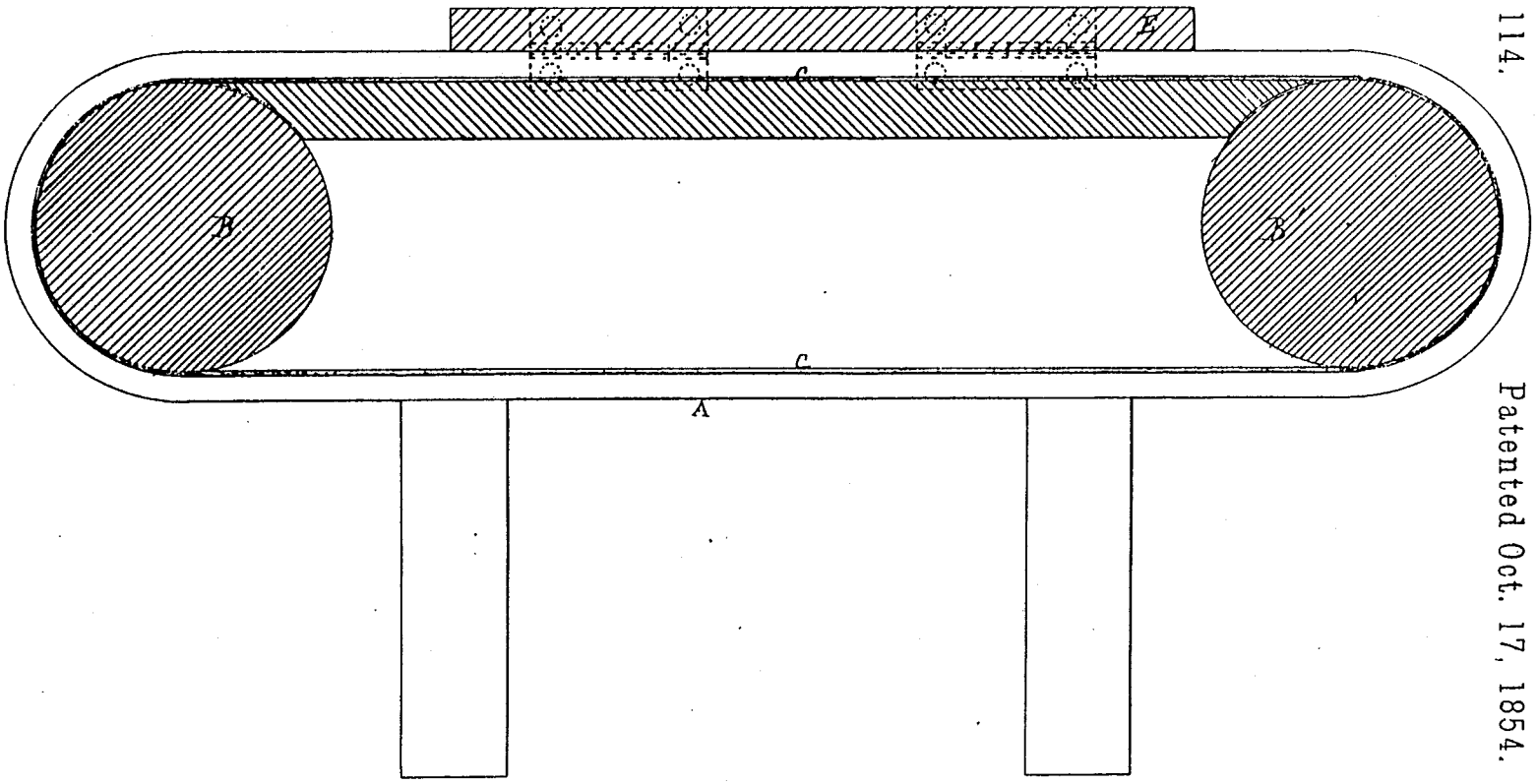
THE MORRIS PETERS CO. PHOTO-LITHO., WASHINGTON, D. C.